US 9,278,695 B2

(12) United States Patent
Shin et al.

(10) Patent No.: US 9,278,695 B2
(45) Date of Patent: Mar. 8, 2016

(54) METHOD, APPARATUS AND SYSTEM FOR DETECTING NARROW ROAD

(71) Applicant: HYUNDAI MOTOR COMPANY, Seoul (KR)

(72) Inventors: Ki Cheol Shin, Seongnam-si (KR); Chang Jae Lee, Ansan-si (KR); Ee Suk Jung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/518,910

(22) Filed: Oct. 20, 2014

(65) Prior Publication Data
US 2015/0148986 A1    May 28, 2015

(30) Foreign Application Priority Data
Nov. 22, 2013   (KR) .................. 10-2013-0143140

(51) Int. Cl.
*B60W 40/06* (2012.01)
*B60W 30/10* (2006.01)
*B60W 40/072* (2012.01)
*G01S 17/42* (2006.01)
*G01S 17/93* (2006.01)

(52) U.S. Cl.
CPC .............. *B60W 40/06* (2013.01); *B60W 30/10* (2013.01); *B60W 40/072* (2013.01); *G01S 17/42* (2013.01); *G01S 17/936* (2013.01); *B60W 2420/52* (2013.01); *B60W 2520/10* (2013.01); *B60W 2540/18* (2013.01); *B60W 2550/146* (2013.01)

(58) Field of Classification Search
CPC ... B60W 40/06; B60W 30/10; B60W 40/072; G01S 17/42; G01S 17/936
See application file for complete search history.

(56) References Cited

U.S. PATENT DOCUMENTS

| | | | | |
|---|---|---|---|---|
| 5,359,666 A  * | 10/1994 | Nakayama | ........... | G05D 1/0246 348/119 |
| 6,819,407 B2 * | 11/2004 | Arita | ..................... | G01S 7/4873 180/169 |
| 8,750,567 B2 * | 6/2014 | Zhang | ................... | G06T 7/0083 348/148 |
| 2011/0238252 A1* | 9/2011 | Takeda | ................ | B60W 40/072 701/31.4 |
| 2011/0320163 A1* | 12/2011 | Markkula | ........... | B60W 40/076 702/150 |
| 2013/0032421 A1* | 2/2013 | Bonne | ................ | B62D 15/0285 180/204 |
| 2015/0019119 A1* | 1/2015 | Shin | ....................... | G01C 21/26 701/300 |

FOREIGN PATENT DOCUMENTS

| | | | |
|---|---|---|---|
| JP | 2005-326963 A | 11/2005 | |
| JP | 2007-210458 A | 8/2007 | |

(Continued)

*Primary Examiner* — Nicholas Kiswanto
(74) *Attorney, Agent, or Firm* — McDermott Will & Emery LLP (57) ABSTRACT

A method for detecting a narrow road includes calculating relative heights of points from a distance measuring sensor to a ground based on distance information. A left boundary point and a right boundary point, at which a difference in relative heights from adjacent points becomes maximal, are acquired. A road boundary line of a driving road is acquired based on the left boundary point and the right boundary point depending on a movement trajectory of the vehicle when a difference in relative heights at the left boundary point and the right boundary point is more than or equal to a reference value. A road width of the driving road is calculated based on the road boundary line. It is detected whether the driving road of the vehicle is a narrow road based on the road width.

20 Claims, 6 Drawing Sheets

(56) References Cited

FOREIGN PATENT DOCUMENTS

| | | |
|---|---|---|
| JP | 2011-232230 A | 11/2011 |
| JP | 2012-071832 A | 4/2012 |
| JP | 2012-071833 A | 4/2012 |
| JP | 2012-238230 A | 12/2012 |
| KR | 10-2011-0080025 A | 7/2011 |
| KR | 10-2013-0072542 A | 7/2013 |
| KR | 10-2013-0088987 A | 8/2013 |

* cited by examiner

METHOD, APPARATUS AND SYSTEM FOR DETECTING NARROW ROAD

CROSS-REFERENCE TO RELATED APPLICATION

This application is based on and claims benefit of priority to Korean Patent Application No. 10-2013-0143140, filed on Nov. 22, 2013 in the Korean Intellectual Property Office, the entire content of which is incorporated herein by reference.

TECHNICAL FIELD

The present inventive concept relates to a method, an apparatus, and a system for detecting a narrow road.

BACKGROUND

Recently, an advanced driver assistance system (ADAS) has been greatly drawn attention in vehicle industries. The ADAS is a system which senses dangerous situations occurring while driving a vehicle by using sensors mounted in a vehicle and cope with the dangerous situations to assure driver's safety and provide convenience to the driver.

When driving a vehicle on a protruding narrow road, a driver may not differentiate a road boundary well, such that it is difficult for the driver to drive a vehicle and the risk of accidents is increased.

SUMMARY

Accordingly, the present inventive concept has been made to solve the above-mentioned problems occurring in the prior art while advantages achieved by the prior art are maintained intact.

One object to be achieved by the present inventive concept is to provide a method, an apparatus, and a system for detecting a narrow road. Another object to be achieved by the present inventive concept is to provide a computer readable recording medium in which a program for allowing a computer to execute the method is recorded. The technical problem to be solved by an exemplary embodiment of the present inventive concept is not limited to the technical problems as described above, and therefore other technical problems may be present.

One aspect of the present inventive concept relates to a method for detecting a narrow road, including receiving, from a distance measuring sensor, distance information of points on a ground line at which a vertical surface in a driving direction of vehicle meets a ground. A relative height of the points from the distance measuring sensor to the ground is calculated based on the distance information. A left boundary point and a right boundary point at which a difference in relative heights from adjacent points among the points becomes maximal, are acquired. A road boundary line of a driving road of the vehicle is acquired based on the left boundary point and the right boundary point depending on a movement trajectory of the vehicle when a difference in relative heights at the left boundary point and the right boundary point is more than or equal to a reference value. A road width of the driving road is calculated based on the road boundary line of the driving road. It is detected that the driving road of the vehicle is a narrow road when the road width of the driving road is less than or equal to a reference road width.

Another aspect of the present inventive concept encompasses a computer readable recording medium including computer executable instructions which control a processor to perform the method for detecting a narrow road.

Still another aspect of the present inventive concept relates to an apparatus for detecting a narrow road, including a relative height calculation unit, a protruding determination unit, a road boundary line acquisition unit, a road width calculation unit, and a narrow road detection unit. The relative height calculation unit is configured to calculate relative heights of points from a distance measuring sensor to a ground based on distance information of the points on a ground line at which a vertical surface in a driving direction of a vehicle received from the distance measuring sensor meets the ground. The protruding determination unit is configured to acquire a left boundary point and a right boundary point at which a difference in relative heights from adjacent points among the points becomes maximal and determine whether the difference in the relative heights at the left boundary point and the right boundary point is more than or equal to a reference value. The road boundary line acquisition unit is configured to acquire a road boundary line of a driving road of the vehicle based on the left boundary point and the right boundary point depending on a movement trajectory of the vehicle when the difference in relative heights at the left boundary point and the right boundary point is more than or equal to a reference value. The road width calculation unit is configured to calculate a road width of the driving road based on the acquired road boundary line of the driving road. The narrow road detection unit is configured to determine whether the road width of the driving road is less than or equal to a reference road width and detect that the driving road of the vehicle is a narrow road when the road width of the driving road is less than or equal to the reference road width.

The distance information may include a distance from the distance measuring sensor to the points on the ground line and an angle between a line segment connecting the distance measuring sensor and the points on the ground line and a reference line of the distance measuring sensor.

Yet another aspect of the present inventive concept encompasses a system for detecting a narrow road, including a speed output apparatus, a steering information output apparatus, a distance measuring sensor, and a detection apparatus. The speed output apparatus is configured to output a moving speed of a vehicle. The steering information output apparatus is configured to output steering information of the vehicle. The distance measuring sensor is configured to output distance information of points on a ground line at which a vertical surface in a driving direction of the vehicle meets a ground. The apparatus for detecting a narrow road is configured to receive the distance information of the points from the distance measuring sensor, calculate relative heights of the points from the distance measuring sensor to the ground based on the distance information, acquire a left boundary point and a right boundary point at which a difference in relative heights from adjacent points among the points becomes maximal, acquire a road boundary line of a driving road of the vehicle based on the left boundary point and the right boundary point depending on a movement trajectory of the vehicle when the difference in relative heights at the left boundary point and the right boundary point is more than or equal to a reference value, calculate a road width of the driving road based on the road boundary line of the driving road, and detect that the driving road of the vehicle is a narrow road when the road width of the driving road is less than or equal to a reference road width.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, the present disclosure will be described with reference to the accompanying drawings. In each drawing, like components are denoted by like reference numerals. Further, the detailed description of known functions and/or components will be omitted. The following disclosed contents mainly describe portions required to understand operations according to various embodiments and the description of elements which make the gist of the description obscure will be omitted.

Further, some of components of the drawings may be exaggerated, omitted, or schematically illustrated. A size of each component does not completely reflect a real size and therefore the contents disclosed herein are not limited by a relative size or interval of the components illustrated in the drawings.

Figure 1:
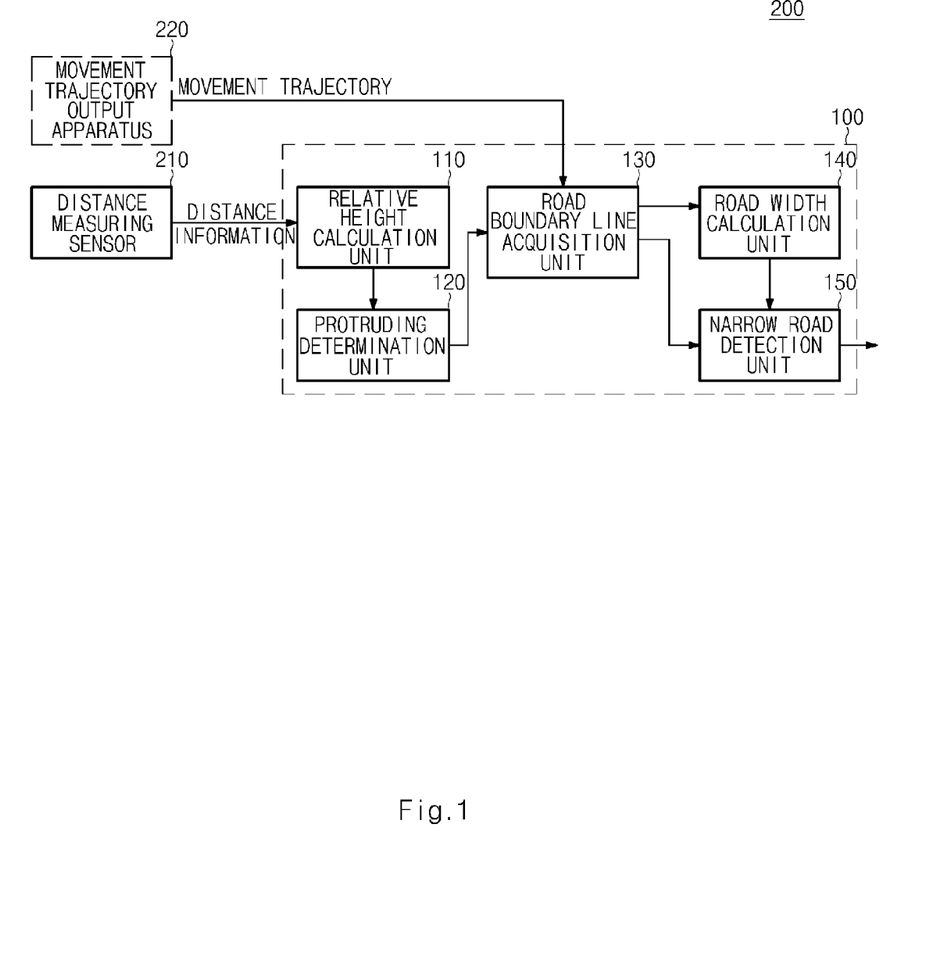
FIG. 1 is a configuration diagram of an apparatus and a system for detecting a narrow road according to an exemplary embodiment of the present inventive concept.

FIG. 1 is a configuration diagram of an apparatus and a system for detecting a narrow road according to an exemplary embodiment of the present inventive concept. Referring to FIG. 1, a system 200 for detecting a narrow road may include a distance measuring sensor 210 and an apparatus 100 for detecting a narrow road. According to an exemplary embodiment of the present inventive concept, the system 200 for detecting a narrow road may further include a movement trajectory output apparatus 220.

In the present disclosure, only components involved in an exemplary embodiment of the present inventive concept will be described to prevent features of the exemplary embodiment of the present inventive concept from obscuring. Therefore, a person having ordinary skill in the art to which the present inventive concept pertains may understand that other general-purpose components in addition to components illustrated in FIG. 1 may be further provided.

The system 200 for detecting a narrow road may acquire distance information of points on a ground line at which a vertical surface in a driving direction of a vehicle meets a ground by using a distance measuring sensor 210 while driving the vehicle and detect whether a driving road of a vehicle is a narrow road based on the distance information of the points on the ground line. The narrow road means a protruding narrow road, such as a road in which a boundary at sides of the road is a cliff, a bridge without a guardrail, and a road protruding from the ground. The system 200 for detecting a narrow road may output an alarm signal or a warning signal which informs a driver that the driving road of the vehicle is the narrow road. The system 200 for detecting a narrow road may be used to control a speed of a vehicle, emergency braking of a vehicle, and the like, by outputting the alarm signal or the warning signal to a vehicle control system, an advanced driver assistance system, an adaptive cruise control system, an automatic emergency braking system, and the like.

The distance measuring sensor 210 may acquire the distance information of the points on the ground line at which the vertical surface in the driving direction of the vehicle meets the ground and output the acquired distance information to the apparatus 100 for detecting a narrow road. The distance measuring sensor 210 may be mounted on the whole surface of the vehicle, such as a bumper and a grill to be able to acquire the distance information of the ground within a radius of a sensor recognition range of the distance measuring sensor 210 in a direction in which a vehicle body is headed.

For example, the distance information may include a distance r from the distance measuring sensor 210 to the points on the ground line and an angle θ between a line segment connecting the distance measuring sensor 210 and the points on the ground line and a reference line of the distance measuring sensor 210.

The points on the ground line acquired depending on a mounting height and a mounting angle of the distance measuring sensor 210 may be changed. According to an exemplary embodiment of the present inventive concept, the distance measuring sensor may be a light detection and ranging (LiDAR) sensor. However, the present inventive concept is not limited thereto, and therefore any sensors that can acquire the distance information of the points on the ground line in the driving direction of vehicle may be used.

The movement trajectory output apparatus 220 may output a movement trajectory of a vehicle. The movement trajectory represents a moving route of a vehicle over time. According to an exemplary embodiment of the present inventive concept, the movement trajectory output apparatus 220 may model the movement trajectory of the vehicle based on moving speed and steering information of the vehicle over time. According to another exemplary embodiment of the present inventive concept, the movement trajectory output apparatus 220 may acquire location information of a vehicle over time by using a global positioning system (GPS) and acquire the movement trajectory of the vehicle based thereon. The location information acquired by using the GPS may include a latitude, a longitude, an altitude, a speed, an azimuth, and the like.

The apparatus 100 for detecting a narrow road may receive the distance information of the points on the ground line in the driving direction of the vehicle from the distance measuring sensor 210 and detect whether the driving road of the vehicle is a narrow road by various calculations using the distance information of the points on the ground line. The apparatus 100 for detecting a narrow road may calculate relative heights of the points on the ground line based on the distance information, acquire a left boundary point and a right boundary point at which a difference in the relative heights becomes maximal, and calculate a road boundary line of the driving road and a road width of the driving road of the vehicle. The apparatus 100 for detecting a narrow road according to an exemplary embodiment of the present inventive concept may correspond to at least one processor, e.g., a microprocessor, or may include at least one processor.

The apparatus 100 for detecting a narrow road may include a relative height calculation unit 110, a protruding determination unit 120, a road boundary line acquisition unit 130, a road width calculation unit 140, and a narrow road detection unit 150.

The relative height calculation unit 110 may calculate the relative heights of the points on the ground line based on the distance information received from the distance measuring sensor 210. The relative height represents the distance from the distance measuring sensor 210 to the ground.

According to an exemplary embodiment of the present inventive concept, the relative height calculation unit 110 may calculate the relative heights of the points on the ground line based on the mounting height, the mounting angle, and the distance information of the distance measuring sensor 210. The detailed description thereof will be made with reference to FIG. 3.

The protruding determination unit 120 may acquire the left boundary point and the right boundary point at which the difference in the relative heights from adjacent points among the points on the ground line becomes maximal and determine whether the difference in the relative heights at the left boundary point and the right boundary point is more than or equal to a reference value.

The protruding determination unit 120 may determine a road as a protruding road and detect whether a road is a narrow road when the difference in the relative heights at the left boundary point and the right boundary point is more than or equal to the reference value. However, the protruding determination unit 120 may end the detection of the narrow road when the difference in the relative heights at the left boundary point and the right boundary point is less than the reference value.

The reference value may be a value which is a reference determining whether a driving road protrudes and the reference value may be calculated based on the heights of components of a vehicle or may be acquired based on an experiment. According to an exemplary embodiment of the present inventive concept, the reference value may be a maximum height which may allow a vehicle to go up and down without damaging the vehicle.

When the driving road of the vehicle is the protruding road, the left boundary point and the right boundary point at which the difference in the relative heights from adjacent points among the points on the ground line becomes maximal may be acquired. In this case, the left boundary point and the right boundary point may become a boundary point which divides the driving road from a region out of the driving road. The acquisition of the left boundary point and the right boundary point will be described in detail with reference to FIGS. 4A and 4B.

The road boundary line acquisition unit 130 may acquire the road boundary line of the driving road of the vehicle based on the left boundary point and the right boundary point depending on the movement trajectory of the vehicle. According to an exemplary embodiment of the present inventive concept, the movement trajectory of the vehicle may be received from the movement trajectory output apparatus 220. According to another exemplary embodiment of the present inventive concept, the movement trajectory of the vehicle may be calculated by the apparatus 100 for detecting a narrow road based on the position of the vehicle.

According to an exemplary embodiment of the present inventive concept, the road boundary line acquisition unit 130 may transform coordinates of the left boundary point and the right boundary point in a local coordinate system into coordinates in a global coordinate system based on the position of the vehicle depending on the movement trajectory of the vehicle and generate the road boundary line in the global coordinate system. An exemplary embodiment of the present inventive concept will be described in detail with reference to FIG. 5.

The road width calculation unit 140 may calculate the road width of the driving road based on the road boundary line of the driving road. In this case, the road width may be a minimum distance between the left boundary line and the right boundary line of the road boundary line. For example, a road width of a straight section may be a distance from the left boundary point to the right boundary point, but a road width of a curved section may not coincide with a distance from the left boundary point to the right boundary point. Therefore, the road width calculation unit 140 may calculate the minimum distance between the left boundary line and the right boundary line of the road boundary line as the road width, based on the road boundary line of the driving road.

The narrow road detection unit 150 may determine whether the road width of the driving road is less than or equal to the reference road width. The reference road width may be a reference determining whether the driving road is the narrow road. Therefore, when the road width of the driving road exceeds the reference road width, the narrow road detection unit 150 may determine that the driving road of the vehicle is not the narrow road and when the road width of the driving road is less than or equal to the reference road width, may detect that the driving road of the vehicle is the narrow road.

When the narrow road is detected, the narrow road detection unit 150 may inform the driver of the vehicle that the driving section is the narrow road section. According to an exemplary embodiment of the present inventive concept, the narrow road detection unit 150 may output or display that the driving section is the narrow road section by using noise, vibration, a picture, or a moving picture.

According to another exemplary embodiment of the present inventive concept, the narrow road detection unit 150 may display a road shape of the detected narrow road while informing the narrow road section, when the narrow road is detected. The narrow road detection unit 150 may display the road shape of the detected narrow road by referring to the road boundary line detected by the road boundary line acquisition unit 130. The apparatus 100 for detecting a narrow road may display the road shape of the narrow road to allow a driver to recognize a portion which is not seen by the driver, thereby greatly reducing the risk of accidents.

As described above, the apparatus 100 for detecting a narrow road or the system 200 for detecting a narrow road may inform the driver that the driving road of the vehicle is the narrow road, thereby assuring safety of the driver and improving convenience of the driver.

Figure 2:
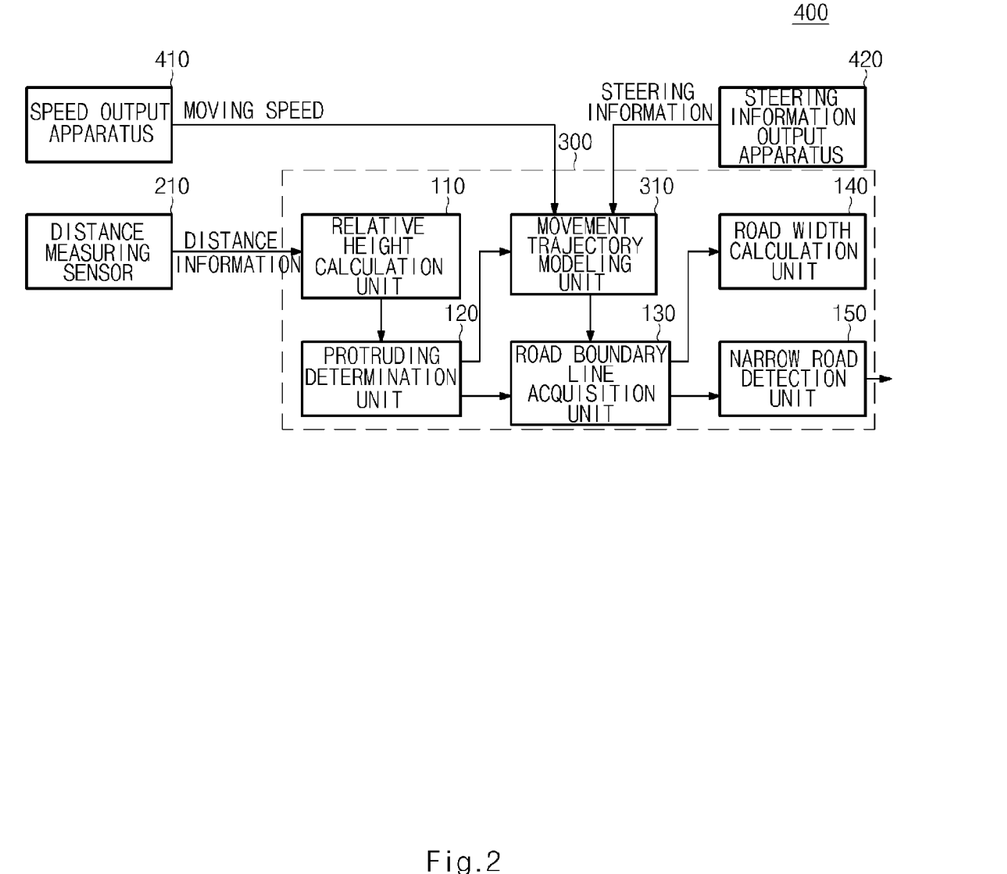
FIG. 2 is a configuration diagram of an apparatus and a system for detecting a narrow road according to another exemplary embodiment of the present inventive concept.

FIG. 2 is a configuration diagram of an apparatus and a system for detecting a narrow road according to another exemplary embodiment of the present inventive concept. Referring to FIG. 1, a system 400 for detecting a narrow road may include a distance measuring sensor 210, a speed output apparatus 410, a steering information output apparatus 420, and an apparatus 300 for detecting a narrow road. The apparatus 100 for detecting a narrow road may include the relative height calculation unit 110, the protruding determination unit 120, the road boundary line acquisition unit 130, the road width calculation unit 140, the narrow road detection unit 150, and a movement trajectory modeling unit 310.

The distance measuring sensor 210, the relative height calculation unit 110, the protruding determination unit 120, the road boundary line acquisition unit 130, the road width calculation unit 140, and the narrow road detection unit 150 which are illustrated in FIG. 2 may correspond to the distance measuring sensor 210, the relative height calculation unit 110, the protruding determination unit 120, the road boundary line acquisition unit 130, the road width calculation unit 140, and the narrow road detection unit 150 which are illustrated in FIG. 1. Therefore, the overlapping description thereof will be omitted.

The system 400 for detecting a narrow road may acquire distance information of points on a ground line at which a vertical surface in a driving direction of a vehicle meets a ground by using a distance measuring sensor 210 while driving the vehicle and detect whether a driving road of a vehicle is a narrow road based on the distance information of the points on the ground line. The system 400 for detecting a narrow road may output an alarm signal or a warning signal which informs a driver that the driving road of the vehicle is the narrow road, when it is detected that the driving road of the vehicle is a narrow road. The system 400 for detecting a narrow road may be used to control a speed of a vehicle, emergency braking of a vehicle, and the like, by outputting the alarm signal or the warning signal to the vehicle control system, the advanced driver assistance system, the adaptive cruise control system, the automatic emergency braking system, and the like.

The distance measuring sensor 210 may acquire the distance information on the points on the ground line at which the vertical surface in the driving direction of the vehicle meets the ground and outputs the acquired distance information to the apparatus 300 for detecting a narrow road. For example, the distance information may include the distance r from the distance measuring sensor 210 to the points on the ground line and the angle θ between the line segment connecting the distance measuring sensor 210 and the points on the ground line and the reference line of the distance measuring sensor 210.

According to an exemplary embodiment of the present inventive concept, the distance measuring sensor may be the light detection and ranging (LiDAR) sensor. However, the present inventive concept is not limited thereto, and therefore any sensors that can acquire the distance information of the points on the ground line in the driving direction of vehicle may be used.

A speed output apparatus 410 may output the moving speed of the vehicle. The speed output apparatus 410 may output the moving speed of the vehicle to the apparatus 300 for detecting a narrow road over time.

The steering information output apparatus 420 may output the steering information of the vehicle. The steering information represents a direction in which the vehicle is headed. According to an exemplary embodiment of the present inventive concept, the steering information output apparatus 420 may acquire the steering information based on operation information of a handle. However, the present inventive concept is not limited thereto, and the steering information output apparatus 230 may be any apparatuses that can output the steering information of the vehicle.

The apparatus 300 for detecting a narrow road may receive the distance information of the points on the ground line in the driving direction of the vehicle and detect whether the driving road of the vehicle is the narrow road by various calculations using the distance information of the points on the ground line. The apparatus 300 for detecting a narrow road calculates the relative heights of the points on the ground line based on the distance information and acquires the left boundary point and the right boundary point at which the difference in the relative heights becomes maximal, and calculate the road boundary line of the driving road and the road width of the driving road of the vehicle. The apparatus 300 for detecting a narrow road according to an exemplary embodiment of the present inventive concept may correspond to at least one processor or may include at least one processor.

The relative height calculation unit 110 calculates the relative heights of the points on the ground line based on the distance information received from the distance measuring sensor 210. The relative height represents the distance from the distance measuring sensor 210 to the ground. The calculation of the relative heights will be described in detail with reference to FIG. 3.

The protruding determination unit 120 may acquire the left boundary point and the right boundary point at which the difference in the relative heights from adjacent points among the points on the ground line becomes maximal and determines whether the difference in the relative heights at the left boundary point and the right boundary point is more than or equal to a reference value. The reference value may be a value which is a reference determining whether the driving road protrudes. The acquisition of the left boundary point and the right boundary point will be described in detail with reference to FIGS. 4A and 4B.

The protruding determination unit 120 may determine a road as the protruding road and detect whether the road is the narrow road when the difference in the relative heights at the left boundary point and the right boundary point is more than or equal to the reference value. However, the protruding determination unit 120 may end the detection of the narrow road when the difference in the relative heights at the left boundary point and the right boundary point is less than the reference value.

The movement trajectory modeling unit 310 may model the movement trajectory of the vehicle based on the moving speed of the vehicle and the steering information of the vehicle when the protruding determination unit 120 determines that the difference in the relative heights at the left boundary point and the right boundary point is more than or equal to the reference value. According to an exemplary embodiment of the present inventive concept, the movement trajectory modeling unit 310 may model the movement trajectory of the vehicle by receiving the moving speed of the vehicle and the steering information of the vehicle from the speed detection apparatus 410 and the steering information detection apparatus 420.

For example, the movement trajectory modeling unit 310 may acquire a position and a heading angle of a vehicle over time based on the movement speed and the steering information of the vehicle and model the movement trajectory of the vehicle based on the position and heading angle of the vehicle over time. The heading angle represents an angle of the direction in which the vehicle is headed.

The road boundary line acquisition unit 130 may acquire the road boundary line of the driving road of the vehicle based on the left boundary point and the right boundary point depending on the movement trajectory of the vehicle. The road boundary line acquisition unit 130 may receive the movement trajectory of the vehicle over time from the movement trajectory modeling unit 310. The road boundary line acquisition unit 130 may generate the road boundary line depending on the movement trajectory of the vehicle and the coordinates of the left boundary point and the right boundary point over time.

According to an exemplary embodiment of the present inventive concept, the road boundary line acquisition unit 130 may transform coordinates of the left boundary point and the right boundary point in a local coordinate system into those in a global coordinate system, based on the position of the vehicle depending on the movement trajectory of the vehicle and generate the road boundary line in the global coordinate system. An exemplary embodiment of the present inventive concept will be described in detail with reference to FIG. 5.

The road width calculation unit 140 may calculate the road width of the driving road based on the road boundary line of the driving road. In this case, the road width may be a minimum distance between the left boundary line and the right boundary line of the road boundary line.

The narrow road detection unit 150 may determine whether the road width of the driving road is less than or equal to the reference road width and detect that the driving road of the vehicle is the narrow road when the road width of the driving road is less than or equal to the reference road width. When the road width of the driving road exceeds the reference road with, the narrow road detection unit 150 may determine that the driving road of the vehicle is not the narrow road and end the detection of the narrow road.

When the narrow road is detected, the narrow road detection unit 150 may inform the driver of the vehicle that the driving section is the narrow road section and display the road shape of the detected narrow road.

Figure 3:
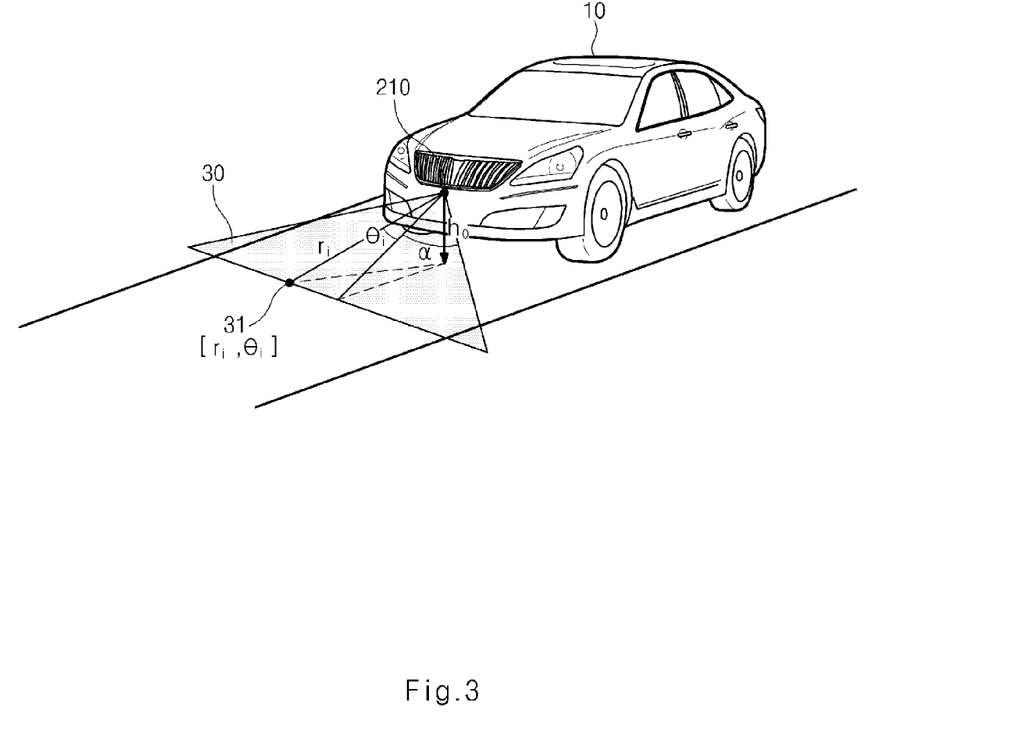
FIG. 3 is a reference diagram for describing an operation of calculating relative heights in an apparatus or a system for detecting a narrow road according to an exemplary embodiment of the present inventive concept.

FIG. 3 is a reference diagram for describing an operation of calculating the relative heights in the apparatus or the system for detecting a narrow road according to an exemplary embodiment of the present inventive concept.

The apparatuses 100 and 300 for detecting a narrow road and the systems 200 and 400 for detecting a narrow road may receive from the distance measuring sensor 210 the distance information of points 31 on the ground line at which the vertical surface in the driving direction of the vehicle 10 meets the ground.

The distance measuring sensor 210 may be mounted on the whole surface of the vehicle, such as a bumper and a grill to be able to acquire the distance information of the points 31 on the ground line within a radius of the sensor recognition range 30 of the distance measuring sensor 210 in a direction in which a vehicle body is headed. In this case, a sensor recognition range 30 may be changed and the acquired points on the ground line may be changed, depending on a mounting height h0 and a mounting angle α of the distance measuring sensor 210.

According to an exemplary embodiment of the present inventive concept, the distance information may include the distance r from the distance measuring sensor 210 to the points on the ground line and the angle θ between the line segment connecting the distance measuring sensor 210 and the points on the ground line and the reference line of the distance measuring sensor 210.

Hereinafter, for convenience of explanation, it is assumed that the distance measuring sensor 210 may detect the distance information (distance, angle) of the points on the ground line, that is, in a form of (ri, θi).

The relative height calculation unit 110 may calculate the relative height hi of the points on the ground line based on the distance information (ri, θi) received from the distance measuring sensor 210. The relative height hi may be calculated by a distance from the distance measuring sensor 210 to the ground based on the following Equation 1.

$$h_i = r_i \cos(\theta_i)\cos(\alpha)$$ [Equation 1]

In the above Equation 1, hi represents the relative heights of the points on the ground detected by the distance measuring sensor 210, ri represents the distance from the distance measuring sensor 210 to the points on the ground line, θi represents an angle between the line segment connecting the distance measuring sensor 210 to the points on the ground line and the reference line of the distance measuring sensor 210, and α represents the mounting angle of the distance measuring sensor 210 which is mounted in the vehicle 10.

As described above, the relative height calculation unit 110 may calculate the relative height hi of the points on the ground line based on the distance information (ri, θi) of the points on the ground line detected by the distance measuring sensor 210.

Figure 4A:
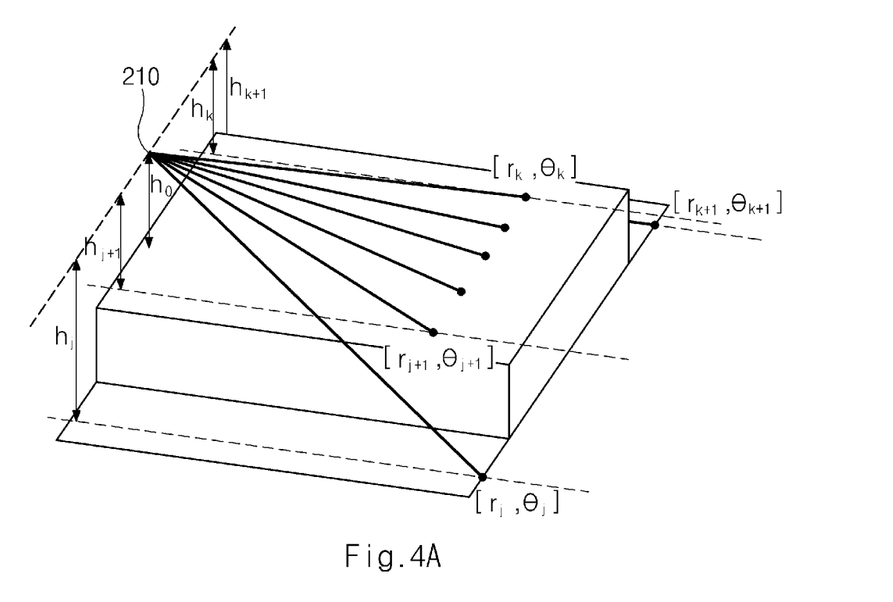
FIGS. 4A and 4B are reference diagrams for describing an operation of acquiring a left boundary point and a right boundary point in the apparatus or the system for detecting a narrow road according to an exemplary embodiment of the present inventive concept.
Figure 4B:
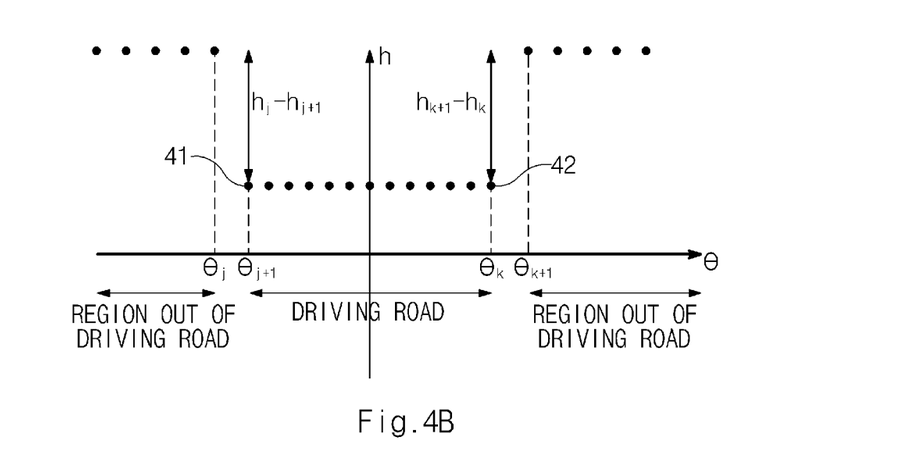

FIGS. 4A and 4B are reference diagrams for describing an operation of acquiring the left boundary point and the right boundary point in the apparatus or the system for detecting a narrow road according to an exemplary embodiment of the present inventive concept.

FIG. 4A represents the distance information of the points 31 on the ground line detected by the distance measuring sensor 210 of the vehicle in the narrow road and the relative heights of the points 31 on the ground line calculated by the relative height calculation unit 110. Referring to FIG. 4A, the distance information of the points on the ground line detected by the distance measuring sensor 210 of the vehicle may be represented by (rk+1, θk+1), (rk, θk), . . . , (ri, θi), . . . , (rj, θj), (rj+1, θj+1) . . . .

Based on the distance information, the relative height calculation unit 110 may calculate the relative heights of the points on the ground line as hk+1, hk, . . . , hi, . . . , hj, hj+1 . . . . In this case, h0 represents the mounting height h0 of the distance measuring sensor 210.

FIG. 4B is a graph illustrating the difference in the relative heights from the adjacent points of the points 31 on the ground line. A horizontal axis θ represents the angle between the line segment connecting the distance measuring sensor 210 to the points on the ground line and the reference line of the distance measuring sensor 210 and a vertical axis represents the relative heights.

Compared with the relative heights of the points on the ground line, the points may have a constant height in the driving road which is portion protruding as hk+1, hk, . . . , hi, . . . , hj, hj+1 . . . and the difference in relative heights of the adjacent points at the boundary point of hk+1 and hk and the boundary point of hj and hj+1 may become maximal. Therefore, the protruding determination unit 130 may acquire the left boundary point 41 and the right boundary point 42 at which the relative heights from the adjacent points among the points on the ground line become maximal.

The protruding determination unit 120 may determine whether the difference in the relative height at the left boundary point and the right boundary point is more than or equal to the reference value. That is, when the difference between the hk+1 and hk and the difference between hj and hj+1 are larger than the reference value hc, the apparatus 100 for detecting a narrow road continuously may detect the narrow road. On the other hand, when the difference between the hk+1 and hk and the difference between hj and hj+1 is less than the reference value hc, the apparatus 100 for detecting a narrow road may end the detection of the narrow road.

Figure 5:
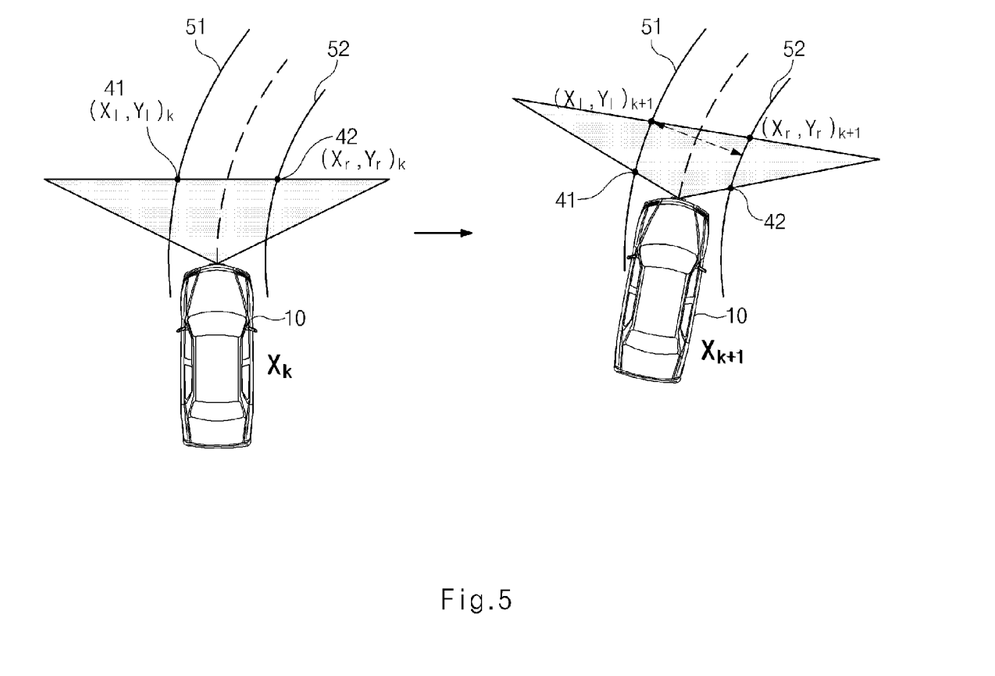
FIG. 5 is a reference diagram for describing an operation of calculating a road width of a driving road in the apparatus or the system for detecting a narrow road according to an exemplary embodiment of the present inventive concept.

FIG. 5 is a reference diagram for describing an operation of calculating the road width of the driving road in the apparatus or the system for detecting a narrow road according to an exemplary embodiment of the present inventive concept.

At t=k, the position of the vehicle may be represented by $X_k=[X_k, Y_k, \theta_k]$ in the global coordinate system. At t=k+1, the position of the vehicle may be represented by $X_{k+1}=[X_{k+1}, Y_{k+1}, \theta_{k+1}]$ in the global coordinate system. As such, the movement trajectory of the vehicle may be represented by the global coordinate system. However, the coordinates of the left boundary point 41 and the right boundary point 42 acquired by the distance measuring sensor 210 may be coordinates of the local coordinate system and therefore there is a need to transform the coordinates of the left boundary point 41 and the right boundary point 42 in the local coordinate system into coordinates in the global coordinate system depending on the movement trajectory of the vehicle.

Therefore, the road boundary line acquisition unit 130 may acquire the coordinates of the left boundary point 41 and the right boundary point 42 in the local coordinate system as $(X_l, Y_l)_k$, $(X_r, Y_r)_k$ and $(X_l, Y_l)_{k+1}$, $(X_r, Y_r)_{k+1}$ which are coordinates in the global coordinate system, based on the movement trajectory of the vehicle.

The road boundary line acquisition unit 130 may transform the coordinates of the left boundary point 41 and the right boundary point 42 into coordinates in the global coordinate system based on the movement trajectory of the vehicle over time and as illustrated in FIG. 5, may generate the road boundary line connecting the coordinates of the left boundary point 41 and the right boundary point 42 in the global coordinate system as illustrated in FIG. 5.

The road width calculation unit 140 may calculate the road width of the driving road which is a minimum distance between a left boundary line 51 and a right boundary line 52 of the road boundary line, based on the road boundary line of the driving road.

Figure 6:
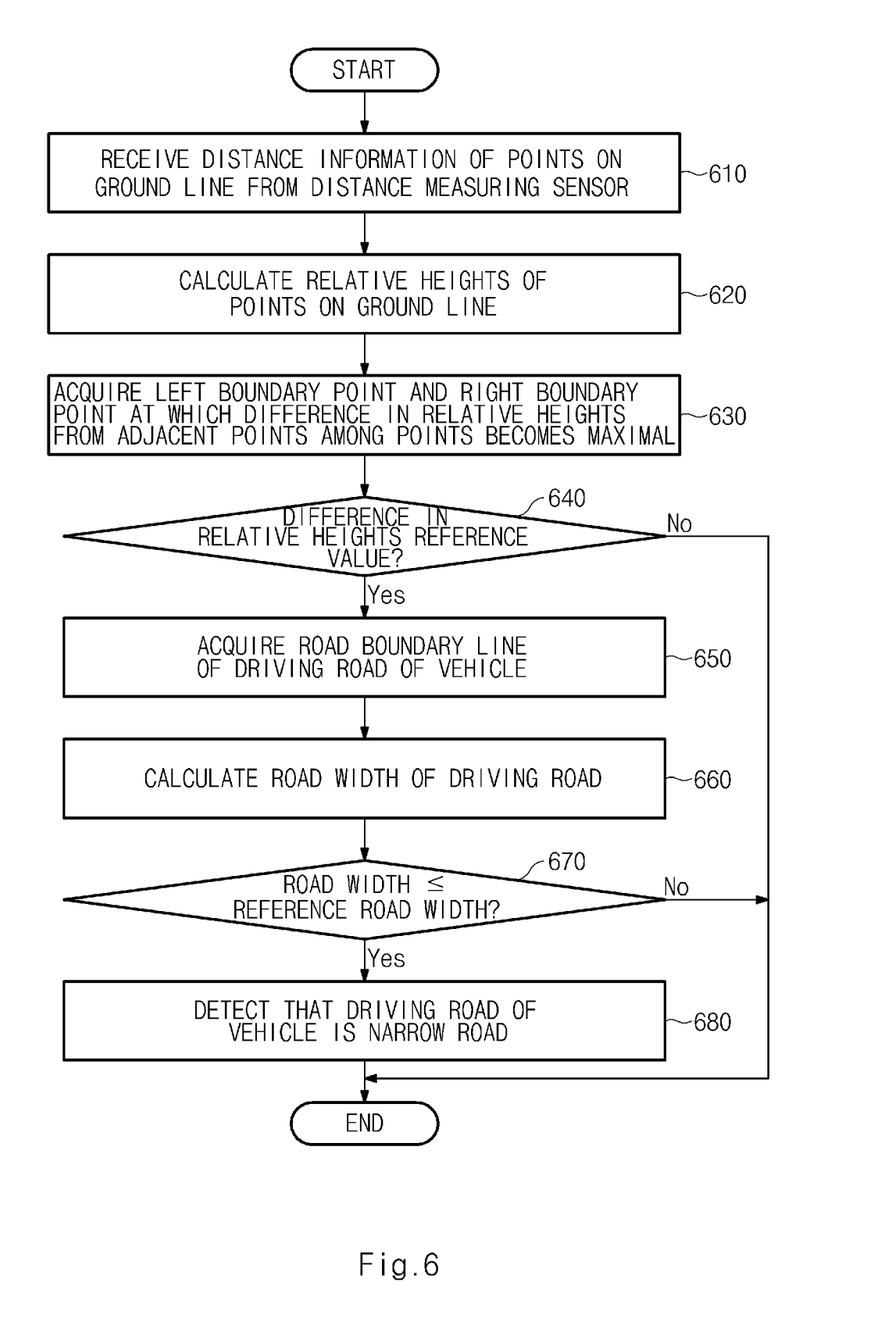
FIG. 6 is a flow chart of a method for detecting a narrow road according to the exemplary embodiment of the present inventive concept.

FIG. 6 is a flow chart of a method for controlling a driving of a vehicle according to an exemplary embodiment of the present inventive concept. The flow chart illustrated in FIG. 6 may include steps which are processed in time series by the apparatuses 100 and 300 for detecting a narrow road or the systems 200 and 400 for detecting a narrow road illustrated in FIGS. 1 to 5. Therefore, even though omitted hereinafter, the contents described above regarding the apparatuses 100 and 300 for detecting a narrow road or the systems 200 and 400 for detecting a narrow road illustrated in FIGS. 1 to 5 may be applied to the flow chart illustrated in FIG. 6.

In step 610, the apparatus 100 for detecting a narrow road may receive from the distance measuring sensor 210 the distance information of the points on the ground line at which the vertical surface in the driving direction of the vehicle meets the ground. For example, the distance information may include the distance r from the distance measuring sensor 210 to the points on the ground line and the angle θ between the line segment connecting the distance measuring sensor 210 and the points on the ground line and the reference line of the distance measuring sensor 210.

In step 620, the relative height calculation unit 110 may calculate the relative heights of the points on the ground line based on the distance information. The relative height represents the distance from the distance measuring sensor 210 to the ground.

In step 630, the protruding determination unit 120 may acquire the left boundary point and the right boundary point at which the difference in the relative height from the adjacent points among the points on the ground line becomes maximal. In this case, the left boundary point and the right boundary point may be the boundary point which divides the driving road from the region out of the driving road.

In step 640, the protruding determination unit 120 may determine whether the difference in the relative heights at the left boundary point and the right boundary point is more than or equal to the reference value. The reference value may be a value which is a reference determining whether a driving road protrudes and the reference value may be calculated based on the heights of components of a vehicle or may be acquired based on an experiment. For example, the reference value may be the maximum height which may allow a vehicle to go up and down without damaging the vehicle.

The protruding determination unit 120 may compare the difference in the relative heights at the left boundary point and the right boundary point with the reference value to proceed to step 650 when the difference in the relative heights is more than or equal to the reference value and end the detection of the narrow road when the difference in the relative heights is less than the reference value.

In step 650, the road boundary line acquisition unit 130 may acquire the road boundary line of the driving road of the vehicle based on the left boundary point and the right boundary point depending on the movement trajectory of the vehicle.

According to an exemplary embodiment of the present inventive concept, the movement trajectory of the vehicle may be received from external apparatuses. According to another exemplary embodiment of the present inventive concept, the movement trajectory of the vehicle may be calculated by the apparatus 100 for detecting a narrow road based on the position of the vehicle.

In step 660, the road width calculation unit 140 may calculate the road width of the driving road based on the road boundary line of the driving road. In this case, the road width may be the minimum distance between the left boundary line and the right boundary line of the road boundary line.

In step 670, the narrow road detection unit 150 may determine whether the road width of the driving road is less than or equal to the reference road width. The narrow road detection unit 150 may compare the road width of the driving road with the reference road width to proceed to step 680 when the road width of the driving road is less than or equal to the reference road width and end the detection of the narrow road when the road width of the driving road exceeds the reference road width.

In step 680, the narrow road detection unit 150 may detect that the driving road of the vehicle is the narrow road. According to an exemplary embodiment of the present inventive concept, when the narrow road is detected, the narrow road detection unit 150 may inform the driver of the vehicle that the driving section is the narrow road section. According to another exemplary embodiment of the present inventive concept, the narrow road detection unit 150 may further display a road shape of the detected narrow road while informing the narrow road section, when the narrow road is detected.

According to the method, apparatus, and system for detecting a narrow road according to exemplary embodiments of the present inventive concept, it is possible to detect the protruding narrow road by using the distance measuring sensor detecting the distance to the ground in front of the vehicle and assure the driver's safety and improve the driver's convenience by informing the narrow road of the user. Therefore, it is possible to reduce the risk of accidents due to the narrow road.

In the present disclosure, 'one embodiment' of principles of the present inventive concept and various changes of the expression means that specific features, structures, characteristics, and the like, associated with the embodiment are included in at lease one embodiment of the principle of the present inventive concept. Therefore, the expression 'one embodiment' and any other modification examples disclosed throughout the present disclosure do not necessarily mean the same embodiment.

All the embodiments and conditional examples disclosed in the present disclosure are described to help a person having ordinary skilled in the art to which the present inventive concept pertains to understand the principle and concept of the present inventive concept and those skilled in the art may be understood that the present inventive concept may be implemented in a modified form within a range which does not deviating from the essential characteristics of the present inventive concept. Therefore, the Examples described above should be considered in view of illustration rather than limitation. It should be interpreted that the scope of the present inventive concept is defined by the following claims rather than the above-mentioned detailed description and all of differences within a scope equivalent thereto are included in the appended claims of the present inventive concept.

What is claimed is:

1. A method for detecting a narrow road, comprising:
receiving, from a distance measuring sensor, distance information of points on a ground line at which a vertical surface in a driving direction of vehicle meets a ground;
calculating a relative height of the points from the distance measuring sensor to the ground based on the distance information;
acquiring a left boundary point and a right boundary point at which a difference in relative heights from adjacent points among the points becomes maximal;
acquiring a road boundary line of a driving road of the vehicle based on the left boundary point and the right boundary point depending on a movement trajectory of the vehicle when a difference in relative heights at the left boundary point and the right boundary point is more than or equal to a reference value;
calculating a road width of the driving road based on the acquired road boundary line of the driving road; and
determining that the driving road of the vehicle is a narrow road when the road width of the driving road is less than or equal to a reference road width.

2. The method of claim 1, further comprising:
receiving a moving speed of the vehicle and steering information of the vehicle; and
calculating the movement trajectory of the vehicle based on the moving speed of the vehicle and the steering information of the vehicle.

3. The method of claim 2, wherein the calculating of the movement trajectory of the vehicle includes:
acquiring a position and a heading angle of the vehicle over time, based on the moving speed of the vehicle and the steering information of the vehicle; and
calculating the movement trajectory of the vehicle based on the position and heading angle of the vehicle over time.

4. The method of claim 1, wherein the calculating of the relative height includes calculating the relative height of the points from the distance measuring sensor to the ground based on a mounting height and a mounting angle of the distance measuring sensor and the distance information.

5. The method of claim 1, wherein the acquiring of the road boundary line includes:
transforming coordinates of the left boundary point and the right boundary point in a local coordinate system into coordinates in a global coordinate system based on the position of the vehicle depending on the movement trajectory of the vehicle; and
generating the road boundary line by connecting the coordinates of the left boundary point and connecting the coordinates of the right boundary point in the global coordinate system.

6. The method of claim 1, wherein the road width is a minimum distance between the left boundary line and the right boundary line of the road boundary line.

7. The method of claim 1, further comprising:
informing a driver of the vehicle that a driving section is a narrow road section, when the narrow road is detected.

8. The method of claim 1, further comprising:
displaying a road shape of the detected narrow road based on the road boundary line, when the narrow road is detected.

9. A computer readable recording medium, comprising computer executable instructions which control a processor to perform the method of claim 1.

10. An apparatus for detecting a narrow road, comprising:
a relative height calculation unit configured to calculate relative heights of points from a distance measuring sensor to a ground based on distance information of the points on a ground line at which a vertical surface in a driving direction of a vehicle received from the distance measuring sensor meets the ground;
a protruding determination unit configured to acquire a left boundary point and a right boundary point at which a difference in relative heights from adjacent points among the points is maximal and determine whether the difference in the relative heights at the left boundary point and the right boundary point is more than or equal to a reference value;
a road boundary line acquisition unit configured to acquire a road boundary line of a driving road of the vehicle based on the left boundary point and the right boundary point depending on a movement trajectory of the vehicle;
a road width calculation unit configured to calculate a road width of the driving road based on the acquired road boundary line of the driving road; and
a narrow road detection unit configured to determine whether the road width of the driving road is less than or equal to a reference road width and detect that the driving road of the vehicle is a narrow road when the road width of the driving road is less than or equal to the reference road width.

11. The apparatus of claim 10, further comprising:
a movement trajectory modeling unit configured to calculate the movement trajectory of the vehicle based on a moving speed of the vehicle and steering information of the vehicle,
wherein the movement trajectory modeling unit calculates the movement trajectory of the vehicle when the difference in the relative heights at the left boundary point and the right boundary point is more than or equal to a reference value.

12. The apparatus of claim 11, wherein the movement trajectory modeling unit is configured to receive the moving speed of the vehicle and the steering information of the vehicle from a speed detection apparatus and a steering information detection apparatus, acquire a position and a heading angle of the vehicle over time based on the moving speed and the steering information, and calculate the movement trajectory of the vehicle based on the position and heading angle of the vehicle over time.

13. The apparatus of claim 10, wherein the relative height calculation unit is configured to calculate the relative height of the points from the distance measuring sensor to the ground based on a mounting height and a mounting angle of the distance measuring sensor and the distance information.

14. The apparatus of claim 10, wherein the road boundary line acquisition unit is configured to transform coordinates of the left boundary point and the right boundary point in a local coordinate system into coordinates in a global coordinate system based on the position of the vehicle depending on the movement trajectory of the vehicle and generates the road boundary line in the global coordinate system.

15. The apparatus of claim 10, wherein the road width is a minimum distance between the left boundary line and the right boundary line of the road boundary line.

16. The apparatus of claim 10, wherein the narrow road detection unit is configured to inform a driver of the vehicle that a driving section is a narrow road section when the narrow road is detected.

17. The apparatus of claim 10, wherein the narrow detection unit is configured to display a road shape of the detected narrow road based on the road boundary line when the narrow road is detected.

18. A system for detecting a narrow road, comprising:
a speed output apparatus configured to output a moving speed of a vehicle;
a steering information output apparatus configured to output steering information of the vehicle;
a distance measuring sensor configured to output distance information of points on a ground line at which a vertical surface in a driving direction of the vehicle meets a ground; and
an apparatus for detecting a narrow road configured to receive the distance information of the points from the distance measuring sensor, calculate relative heights of the points from the distance measuring sensor to the ground based on the distance information, acquire a left boundary point and a right boundary point at which a difference in relative heights from adjacent points among the points becomes maximal, acquire a road boundary line of a driving road of the vehicle based on the left boundary point and the right boundary point depending on a movement trajectory of the vehicle when the difference in relative heights at the left boundary point and the right boundary point is more than or equal to a reference value, calculate a road width of the driving road based on the acquired road boundary line of the driving road, and detect that the driving road of the vehicle is a narrow road when the road width of the driving road is less than or equal to a reference road width.

19. The method of claim 1, wherein the distance information includes a distance from the distance measuring sensor to the points on the ground line and an angle between a line segment connecting the distance measuring sensor and the points on the ground line and a reference line of the distance measuring sensor.

20. The apparatus of claim 10, wherein the distance information includes a distance from the distance measuring sensor to the points on the ground line and an angle between a line segment connecting the distance measuring sensor and the points on the ground line and a reference line of the distance measuring sensor.

* * * * *